(12) United States Patent
Wilson

(10) Patent No.: US 7,343,236 B2
(45) Date of Patent: Mar. 11, 2008

(54) ELECTRONIC CONTROL SYSTEM

(75) Inventor: Barry Wilson, Yukon, OK (US)

(73) Assignee: Autocraft Industries, Inc., Oklahoma City, OK (US)

( * ) Notice: Subject to any disclaimer, the term of this patent is extended or adjusted under 35 U.S.C. 154(b) by 0 days.

(21) Appl. No.: 11/257,269

(22) Filed: Oct. 24, 2005

(65) Prior Publication Data

US 2007/0093950 A1    Apr. 26, 2007

(51) Int. Cl.
*G06F 17/00* (2006.01)
*B60W 10/10* (2006.01)

(52) U.S. Cl. ............................ 701/51; 701/55; 701/56; 701/58; 701/62; 701/95; 477/34; 477/36; 477/107; 477/110

(58) Field of Classification Search ............ 701/51–60, 701/69, 87, 95, 61, 62; 340/456; 475/1, 475/6; 477/15, 31, 34, 36, 41, 69, 107, 110
See application file for complete search history.

(56) References Cited

U.S. PATENT DOCUMENTS

| | | | | |
|---|---|---|---|---|
| 4,643,048 A | * | 2/1987 | Hattori et al. | 477/124 |
| 5,166,879 A | * | 11/1992 | Greene et al. | 701/62 |
| 5,526,261 A | * | 6/1996 | Kallis et al. | 701/51 |
| 5,839,083 A | * | 11/1998 | Sugiyama | 701/62 |
| 6,085,140 A | * | 7/2000 | Choi | 701/55 |
| 6,095,945 A | * | 8/2000 | Graf | 477/97 |
| 6,182,000 B1 | * | 1/2001 | Ohta et al. | 701/55 |
| 6,449,548 B1 | * | 9/2002 | Jain et al. | 701/56 |
| 6,470,252 B2 | * | 10/2002 | Tashiro et al. | 701/51 |
| 6,684,143 B2 | * | 1/2004 | Kim et al. | 701/51 |
| 6,694,241 B2 | * | 2/2004 | Kim | 701/55 |

\* cited by examiner

*Primary Examiner*—Jack Keith
*Assistant Examiner*—Chuong Nguyen
(74) *Attorney, Agent, or Firm*—David W. Carstens; Carstens & Cahoon, LLP

(57) ABSTRACT

The present invention provides a universal power control module for automatic transmissions. The power control module includes a processor and at least two sensor inputs that convey engine and vehicle data to the processor. This data may include vehicle speed, engine temperature, throttle position, engine RPM, and other operational parameters. Both the type and number of data input to the processor may be changed to accommodate different engine and transmission combinations. At least two outputs convey commands from the processor to the transmission. Program circuitry defines the gear shift pattern of the transmission according to the engine and vehicle sensor data. This program circuitry can be programmed to define an optimal gear shift pattern for any combination of engine and transmission, independent of make and model.

3 Claims, 15 Drawing Sheets

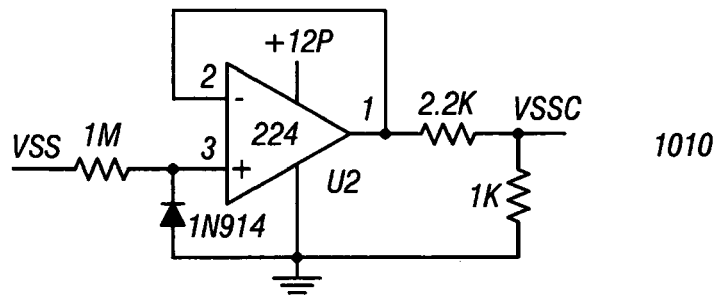
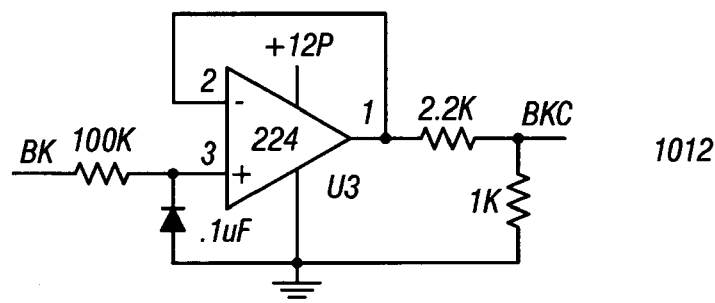
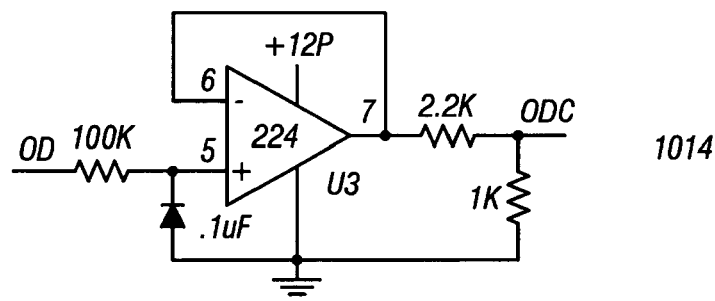
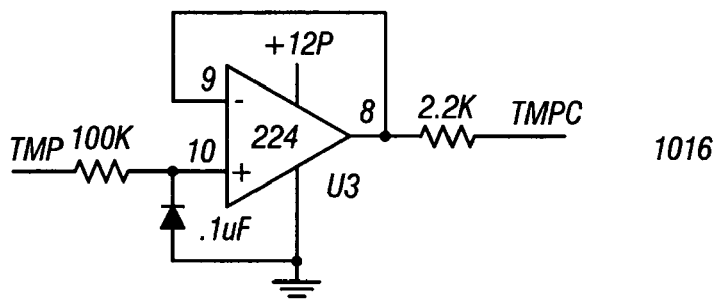
*FIG. 10*
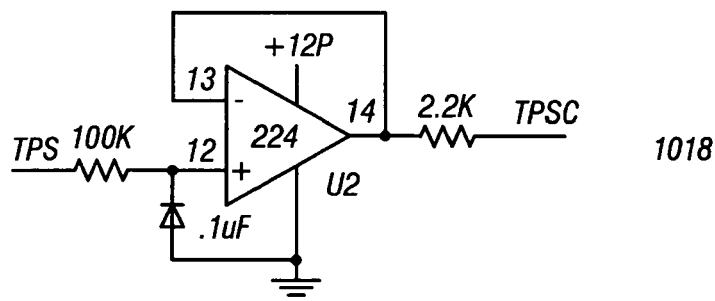

ELECTRONIC CONTROL SYSTEM

TECHNICAL FIELD

The present invention relates generally to automobile transmissions, and more specifically to transmission control units for automatic transmissions.

BACKGROUND OF THE INVENTION

The primary job of automobile transmissions is to provide a wide range of output speed for a vehicle while allowing the engine to operate within a narrow range of speeds. The earliest automobiles offered only manual transmissions, but as cars grew larger engineers began searching for a way to allows cars to automatically shift from one gear to another.

Modern electronically controlled transmissions use electric solenoids to control the hydraulic circuits that actuate the clutches and bands. A control unit controls the shift points of the gears based on inputs from various other sensors on the engine and transmission. The control unit detects such parameters as throttle position, vehicle speed, engine speed, engine load, stop light switch position, etc., to control exact shift points, as well as how soft or firm the shift should be.

Current engine/transmission combinations use either a single control unit to control the function of both the engine and transmission or separate controllers for each. These control units are custom designed for each engine and transmission design. Until recently this has not been a problem, since engines and transmissions are usually specifically designed to be used together. However, as automobile production has begun to shift to developing nations, there has been a trend to combine engines and transmissions designed by different manufacturers, particularly for sale in the domestic markets of these developing nations.

The main competitive advantage of these developing countries is lower manufacturing costs, as opposed to technical innovation. Therefore, there is a tendency to use off the shelf designs rather than develop new ones. One consequence of this off the shelf production approach is the mixing and matching of engines and transmissions that were designed by different automotive firms. This raises the problem of properly controlling and coordinating their operation, because the control units are custom designed for specific models and combinations of engines and transmissions. In some cases, the separate controllers on the engine and transmission may have trouble communicating with each other. For example, a transmission control unit may have sensor inputs that differ from the engine's output. In other cases, a transmission that is normally controlled by a single controller in the engine is paired with an engine that does not provide such control. This lack of coordination impairs smooth gear shifting in the transmission.

Therefore, it would be desirable to have a universal transmission control unit that is generic across transmission brands and models and can be custom programmed to accommodate any combination of engine and transmission.

SUMMARY OF THE INVENTION

The present invention provides a universal power control module for automatic transmissions. The power control module includes a processor and at least two sensor inputs that convey engine and vehicle data to the processor. This data may include vehicle speed, engine temperature, throttle position, engine RPM, and other operational parameters. Both the type and number of data input to the processor may be changed to accommodate different engine and transmission combinations. At least two outputs convey commands from the processor to the transmission. Program circuitry defines the gear shift pattern of the transmission according to the engine and vehicle sensor data. This program circuitry can be programmed to define an optimal gear shift pattern for any combination of engine and transmission, independent of make and model.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 10 shows detailed circuit diagrams for the sensor protection circuits in accordance with an embodiment of the present invention;

DETAILED DESCRIPTION OF THE DRAWINGS

Figure 1:
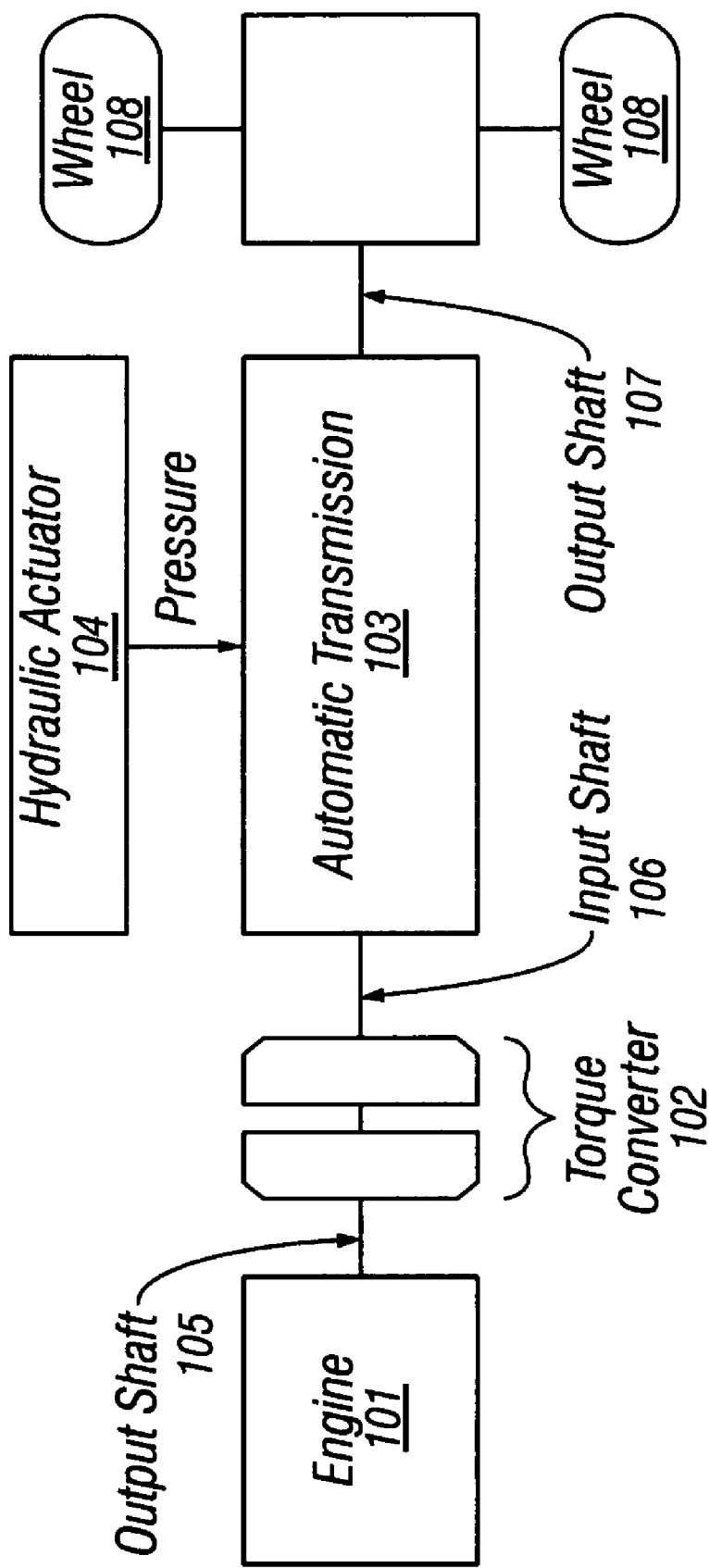
FIG. 1 shows a simplified block diagram of the power transmission system in an automobile in which the present invention may be implemented.

FIG. 1 shows a simplified block diagram of the power transmission system in an automobile. It is essentially comprised of four main elements: an engine 101, a torque converter 102, an automatic transmission 103 and a hydraulic actuator 104. The engine 101 is the power source of the entire system. This power is then transmitted to the torque converter 102 via the engine output shaft 105. The torque converter 102 amplifies and transmits the engine output torque to the automatic transmission 103 via the transmission input shaft 106. The hydraulic actuator 104 controls the shift process in the automatic transmission 103 by applying pressure to engage and release the friction elements. The transmission 103 in turn delivers drive torque to the wheels 108 of the automobile via an output shaft 107.

Figure 2:
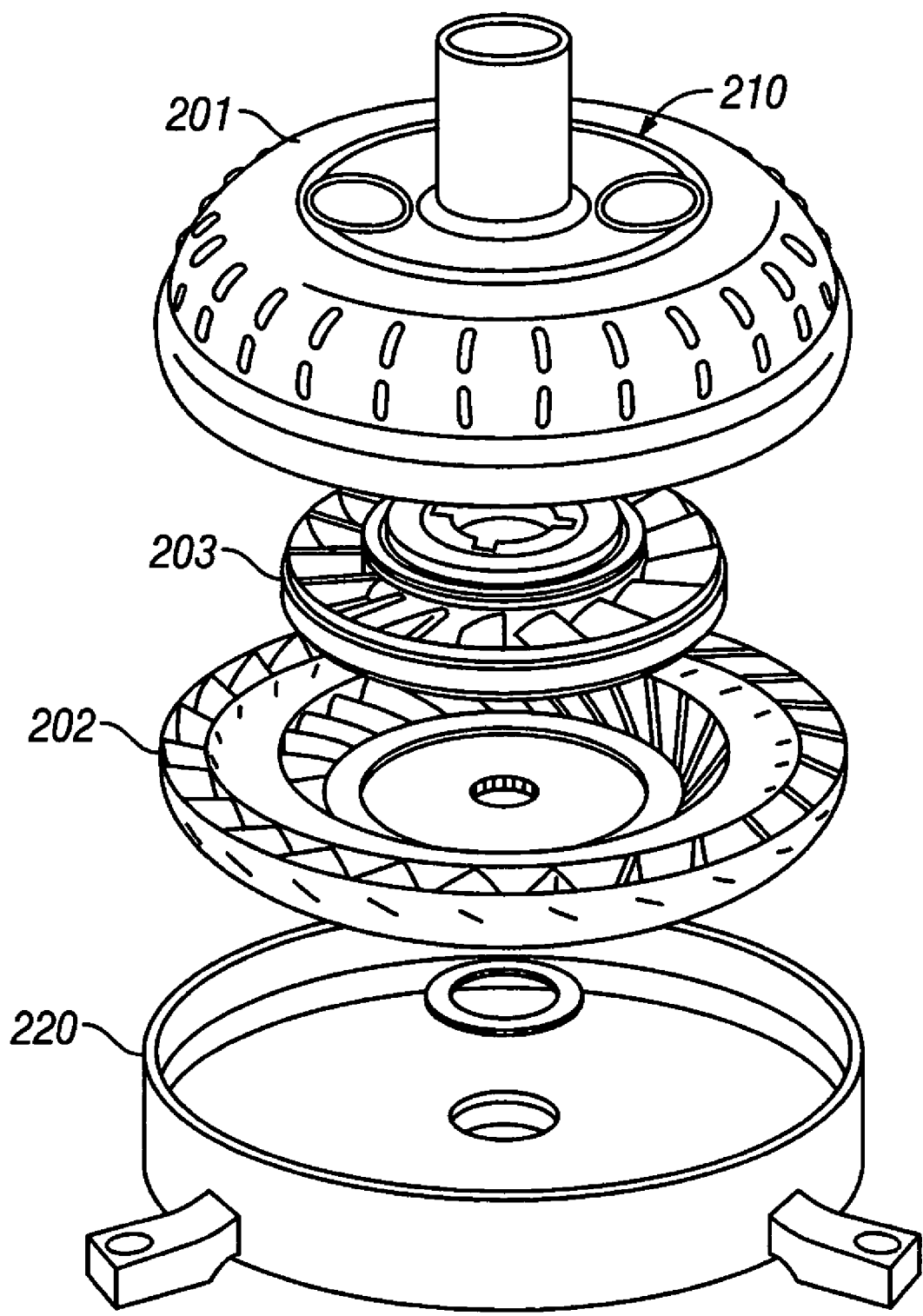
FIG. 2 shows an exploded, perspective view of a torque converter.

FIG. 2 shows an exploded, perspective view of a torque converter. The key to the modern automatic transmission is the torque converter, which replaces the clutch found in manual transmissions. A torque converter is a type of fluid coupling that multiplies the turning power provided by the engine and allows the engine to spin somewhat independently of the transmission. It is connected to the engine by means of a transmission shaft (not shown) that fits next to but does not actually touch the engine crankshaft. Therefore, there is no direct connection between the engine and the transmission.

Inside the housing of the torque converter are several components that multiply the power of the engine. These components include the impeller (or pump) 201, the turbine 202, and the stator (or guide wheel) 203. The housing 210 of the torque converter is bolted to the flywheel of the engine and turns at whatever speed the engine is running. The fins that make up the pump (not visible from this angle) are attached to the housing 210 and hence also turn at the same speed as the engine.

The impeller 201 and the turbine 202 face one another inside the round metal casing 220. The impeller 201 is on the engine side and the turbine 202 is on the transmission side. Both of these components have blades that catch transmission fluid, causing them to spin. As one fan begins to spin, the other spins as well.

The turbine 202 rides within the cover 220 and is attached to the drive train via a spline fit to the input shaft of the transmission. When the fluid enters the blades of the turbine 202 the turbine spins, causing the transmission to spin, which moves the wheels of the automobile.

The impeller 201 is a centrifugal pump. As it spins, transmission fluid moves to the outside of the blades through centrifugal force, where it is redirected by a third fan, the stator 203, back to the turbine side. As fluid is flung to the outside, a vacuum is created that draws more fluid into the center.

The stator 203, which changes fluid flow between the pump 201 and turbine 202, is what makes a torque converter a torque multiplier and not strictly a fluid coupler. The torque multiplier effect allows the vehicle to output more torque to the drive wheels than the engine is actually producing. This occurs while the converter is in its "stall mode" (when the turbine is spinning considerably slower than the pump) and during vehicle acceleration. As the vehicle accelerates, torque multiplication decreases until it reaches a ratio of 1:1 (no torque increase over crankshaft torque). A typical torque converter will have a torque multiplication ratio around 2.5:1.

Figure 3:
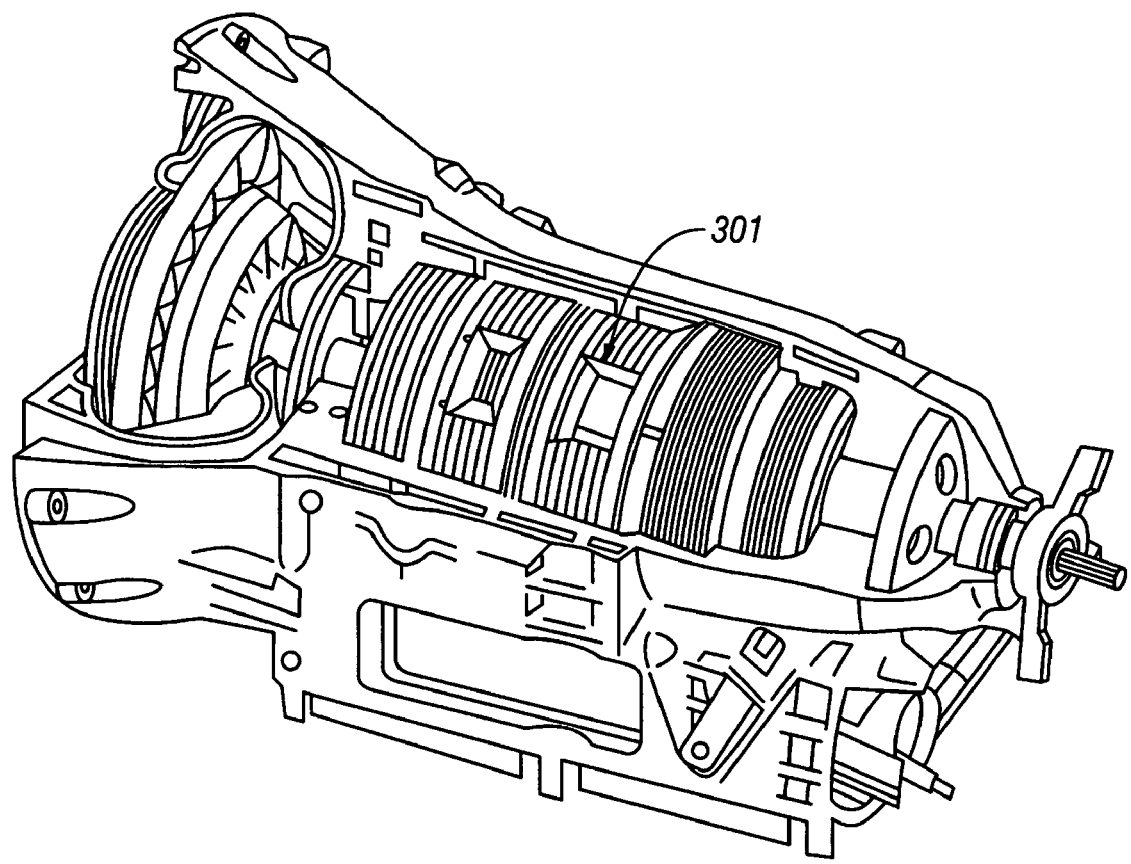
FIG. 3 shows a cutaway view of an automatic transmission in which the present invention may be implemented.

FIG. 3 shows a cutaway view of an automatic transmission in which the present invention may be implemented. The speed ratio between the input and outputs shafts of the transmission defines the gear ratio of an automatic transmission. Whereas manual transmissions lock and unlock different sets of gears to the output shaft to achieve various gear ratios, automatic transmissions use the same gears to produce all of the gear ratios. The device that allows automatic transmissions to do this is the planetary gearset 301.

Figure 4:
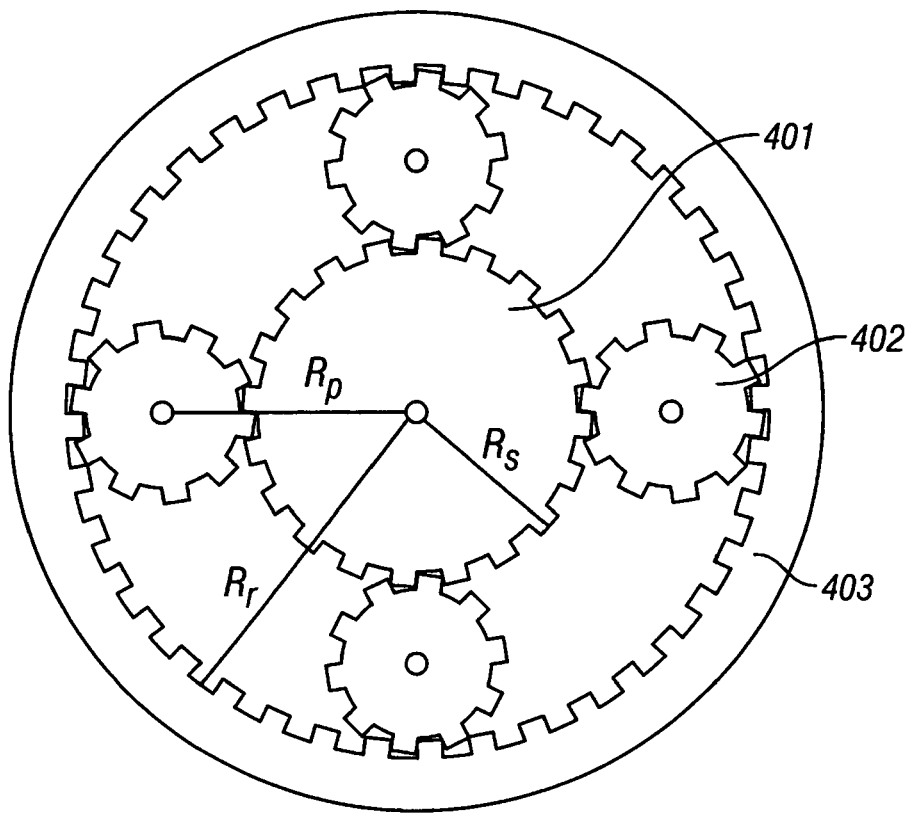
FIG. 4 shows an end on view of a planetary gearset.

FIG. 4 shows an end on view of a planetary gearset. The gearset is called planetary because the gears are circular and revolve around a central gear known as a sun gear. A planetary gearset system has three major elements: a sun gear 401, planet gears and 402, and a ring gear and drum 403, all remaining in constant mesh. The planet gears are connected to each other through a common carrier which allows the gears to spin on shafts called pinions, which are attached to the carrier.

Figure 5:
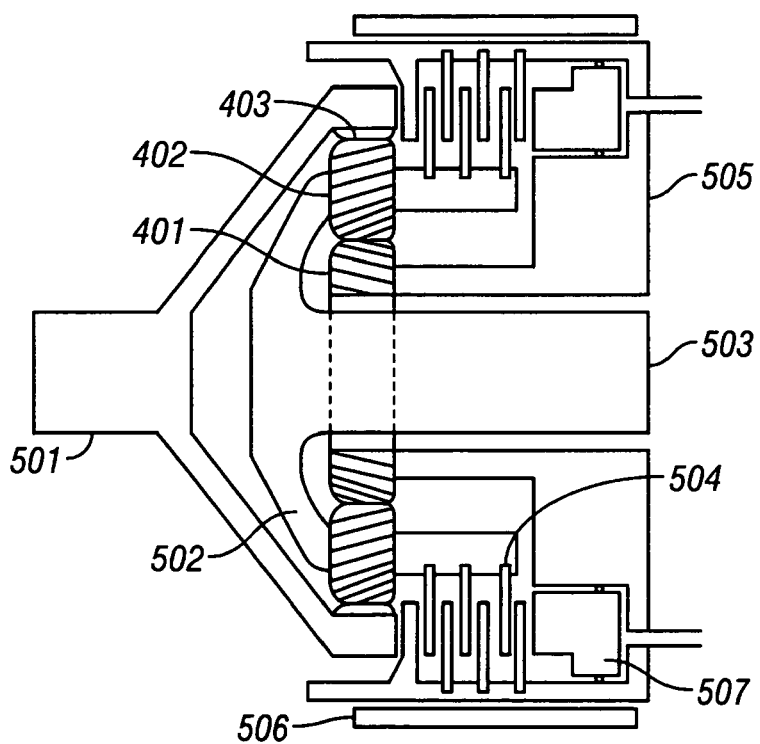
FIG. 5 shows a side view of the planetary gearset, including the other structural components with which the gears interact.

FIG. 5 shows a side view of the planetary gearset, including the other structural components with which the gears interact. The input shaft 501 from the engine is connected to the ring gear 403. The Output shaft 503 is connected to the planet carrier 502, which is connected to a clutch pack 504. The sun gear 401 is connected to a drum 505, which is connected to the other half of the clutch pack. Surrounding the outside of the drum 505 is a band 506 that can be tightened around the drum when required to prevent the drum with the attached sun gear from turning.

Each of the gearset components (sun gear 401, planet gears 402, or ring gear 403) can act as the input, the output, or be held stationary. The gear ratio is determined by which component fulfills which role. For example, the ring gear 403 may be connected to the input shaft 501 coming from the engine, while connecting the planet gears 402 to the planet carrier 502 and the output shaft 503, and locking the sun gear 401 so that it cannot move. In this scenario, when the ring gear 403 turns, the planet gears 402 revolve around the sun gear 401,which is held stationary. This causes the planet carrier 502 to turn the output shaft 503 in the same direction as the input shaft 501 but at a slower speed causing gear reduction (similar to a car in first gear).

If the sun gear 401 is unlocked and the ring gear 403 and planet gears 402 are locked together, this will cause all three elements to turn at the same speed so that the output shaft 503 will turn at the same rate of speed as the input shaft 501, producing a 1:1 gear ratio. This is similar to a car in high gear.

Yet another example involves locking the planet carrier 502 from moving, while applying power to the ring gear 403 which will cause the sun gear 401 to turn in the opposite direction. This obviously is reverse gear.

The following table shows an example of different gear ratios produced by changes in the input, output, and stationary components:

TABLE 1

| Input | Output | Stationary | Gear Ratio |
| --- | --- | --- | --- |
| Sun | Planet Carrier | Ring | 3.4:1 |
| Planet Carrier | Ring | Sun | 0.71:1 |
| Sun | Ring | Planet Carrier | −2.4:1 |

The first two configurations are forward gears; the third is reverse. Locking any two of the three components together will lock up the whole device at a 1:1 gear reduction, as in the second example above. The first gear ratio listed in the table is a reduction, meaning the output speed is slower than the input speed. The second gear ratio is an overdrive, wherein the output speed is faster than the input speed. The last is a reduction again, but the output direction is reversed. There are several other ratios that can be produced by this planetary gear set, but the ones listed above are sufficient for the present illustration. Two gearsets in a row can produce the four forward gears and one reverse gear typical of automatic transmissions.

The shifting of gears in an automatic transmission is controlled by the clutch packs and bands.

Figure 6:
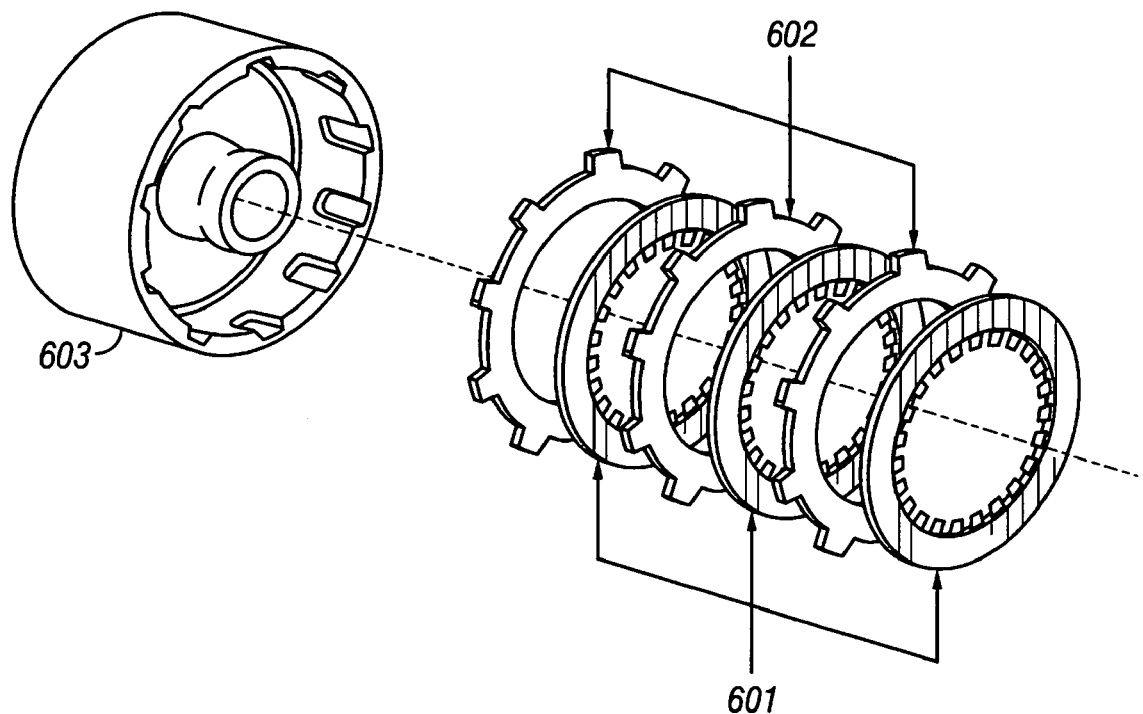
FIG. 6 shows an exploded perspective view of a clutch pack.

FIG. 6 shows an exploded perspective view of a clutch pack. Most automatic transmissions use a multiple-disc clutch operation wherein a series of friction discs 601 are placed between steel plates 602. The friction discs 601 and steel plates 602 are placed into a steel drum housing 603. This assembly is known as a clutch pack. The clutch is actuated by pressurized hydraulic fluid that enters a piston inside the clutch (507 in FIG. 5) and causes the piston to press against the plates, locking the assembly together and driving the wheels. The friction plates 601 are splined on the inside, where they lock to the gears. The steel plates 602 are splined on the outside, where they lock to the clutch housing 603. When pressure releases (e.g., engine in idle), the piston disengages and the wheels stop turning. Springs make sure that the clutch releases when the pressure is reduced.

Figure 7:
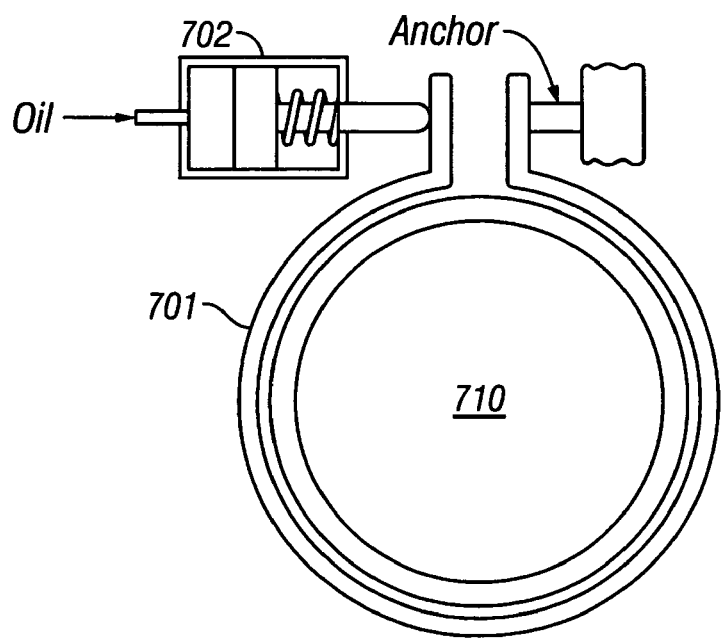
FIG. 7 shows a transmission band.

FIG. 7 shows a transmission band. The transmission band is a metal band 701 that wraps around the clutch housing or drum 710. A hydraulic piston 702 inside the transmission case pushes on the band 701. When the band tightens, it engages the gears and locks that part of the gear train to the housing 710. When hydraulic pressure is removed, the bands loosen and release the gears.

Referring back to FIG. 5, the clutch pack 504 is used to lock the planet carrier 502 with the sun gear 401, forcing both to turn at the same speed. If both the clutch pack 504 and the band 506 are released, the system would be in neutral. In neutral, the input shaft 501 would turn the planet gears 402 against the sun gear 401, but since nothing is holding the sun gear, it will just spin free and have no effect on the output shaft 503. To place the transmission in first gear, the band 506 is applied to hold the sun gear 401 from moving. To shift from first to high gear, the band 506 is released and the clutch 504 is applied, causing the output shaft 503 to turn at the same speed as the input shaft 501.

Obviously, more combinations are possible using two or more planetary gearsets to provide the different forward speeds and reverse that are found in modern automatic transmissions.

Figure 8:
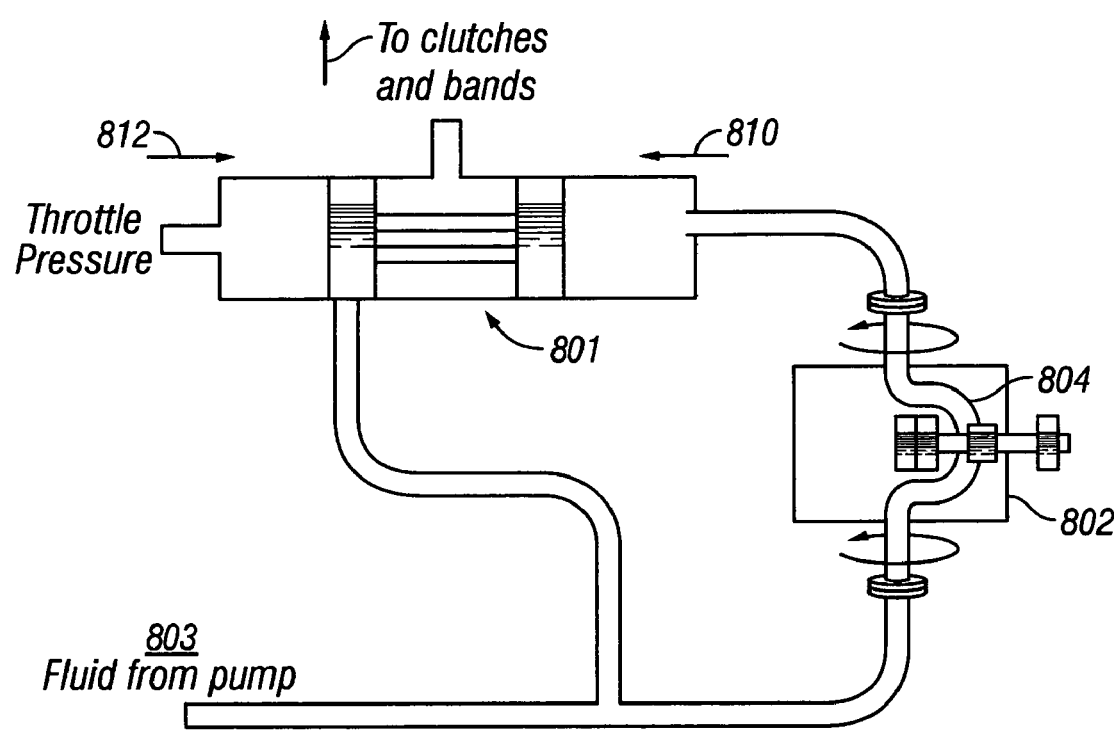
FIG. 8 shows the operation of a transmission shift valve.

FIG. 8 shows the operation of a transmission shift valve. Shift valves supply hydraulic pressure to the clutches and bands to engage each gear and determines when to shift from one gear to the next. For example, the 3-4/4-3 shift valve determines when to shift between the third to fourth gears. The shift valve 801 is pressurized by fluid from the governor 802 on one side and from the throttle valve (not shown) on the other side, as indicated by arrows 810, 812. The governor 802 and throttle valve are supplied with fluid 803 by the pump (also not shown), and they route the fluid to one of two circuits to determine in which gear the automobile runs.

The governor 802 is a valve that tells the transmission how fast the car is going. It is connected to the transmission output shaft, so as the car moves faster the car moves, the faster the governor spins. Inside the governor 802 is a spring-loaded valve 804 that opens in proportion to how fast the governor is spinning.

The timing of the gear shift depends on the rate of acceleration. Using the example of a 1-2 shift, as the automobile accelerates, pressure from the governor 802 builds and forces the shift valve 801 over until the first gear circuit is closed and the second gear circuit opens. If the car is accelerating at light throttle, the throttle valve does not apply much pressure against the shift valve 801. However, when the car accelerates quickly the throttle valve applies more pressure against the shift valve 801, which requires higher pressure from the governor 802 (faster vehicle speed) before the shift valve 801 moves over far enough to engage second gear. Each shift valve responds to a particular pressure range.

Modern electronically controlled transmissions use electric solenoids to control the hydraulic circuits that actuate the clutches and bands. A control unit controls the shift points of the gears based on inputs from various sensors on the engine and transmission. The control unit detects parameters such as throttle position, vehicle speed, engine speed, engine load, stop light switch position, etc., to control exact shift points, as well as how soft or firm the shift should be.

Figure 9:
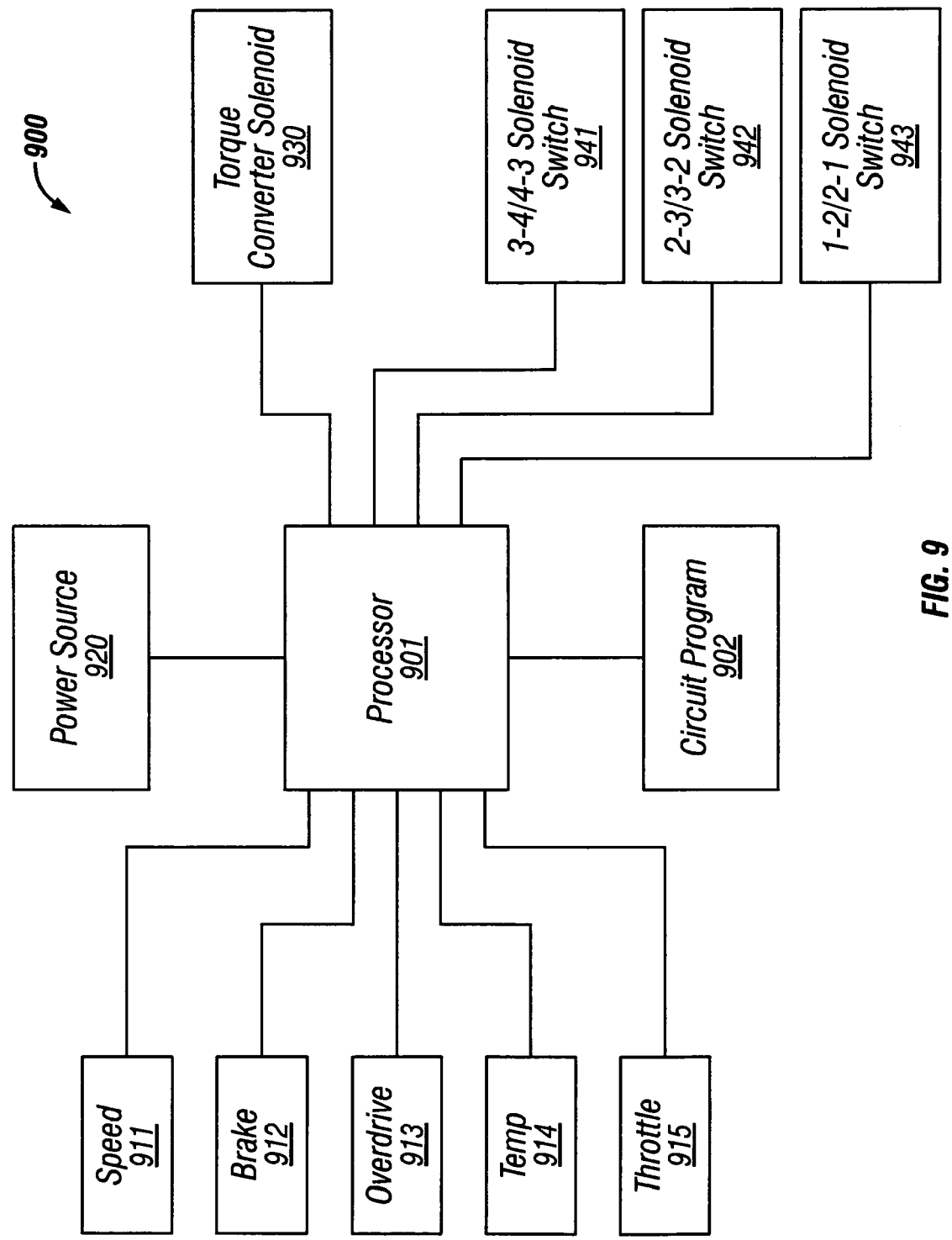
FIG. 9 is a block diagram of a universal, programmable transmission Power Control Module (PCM) in accordance with an embodiment of the present invention.

FIG. 9 is a block diagram of a universal, programmable transmission Power Control Module (PCM) in accordance with an embodiment of the present invention. The PCM 900 controls the operation of the Torque Converter Clutch (TCC) solenoid and the gear shift solenoids, based on data inputs from engine sensors.

Vehicle data from remote sensors is fed to the processor 901 through the respective protection circuits 911-915 corresponding to those sensors. In the present example, the sensor inputs include vehicle speed 911, brake 912, overdrive 913, temperature 914, and throttle position 915. Likewise, the vehicle speed sensor (VSS) provides vehicle speed data to the PCM to determine the shift schedule. The throttle position sensor (TPS) provides throttle position data to the PCM to determine shift scheduling. The engine coolant temperature sensor provides temperature to the PCM to control the TCC solenoid operation. In one embodiment, engine operating temperature above 128° F. is required before the TCC can be engaged. The brake on/off switch (BOO) closes when the brake is applied, and in response the PCM disengages the TCC.

FIG. 10 shows detailed circuit diagrams 1010-1018 for the sensor protection circuits in accordance with an embodiment of the present invention. These are standard protection circuits designed to prevent damaging power surges to the processor 910.

In addition to the inputs listed above, other possible sensor inputs include engine load and RPM. For example, an electronic ignition (EI) or Profile Ignition Pickup (PIP) sensor provides RPM signals to the PCM for shift scheduling of the TCC and shift solenoid.

Unlike prior art PCMs, the input/outputs monitored by the PCM 900 can be changed according to the needs of the particular engine/transmission combination in question. Not only can the specific inputs be changed, but so can the number of inputs. In one embodiment of the present invention, the number of inputs can range from two to five.

Figure 11:
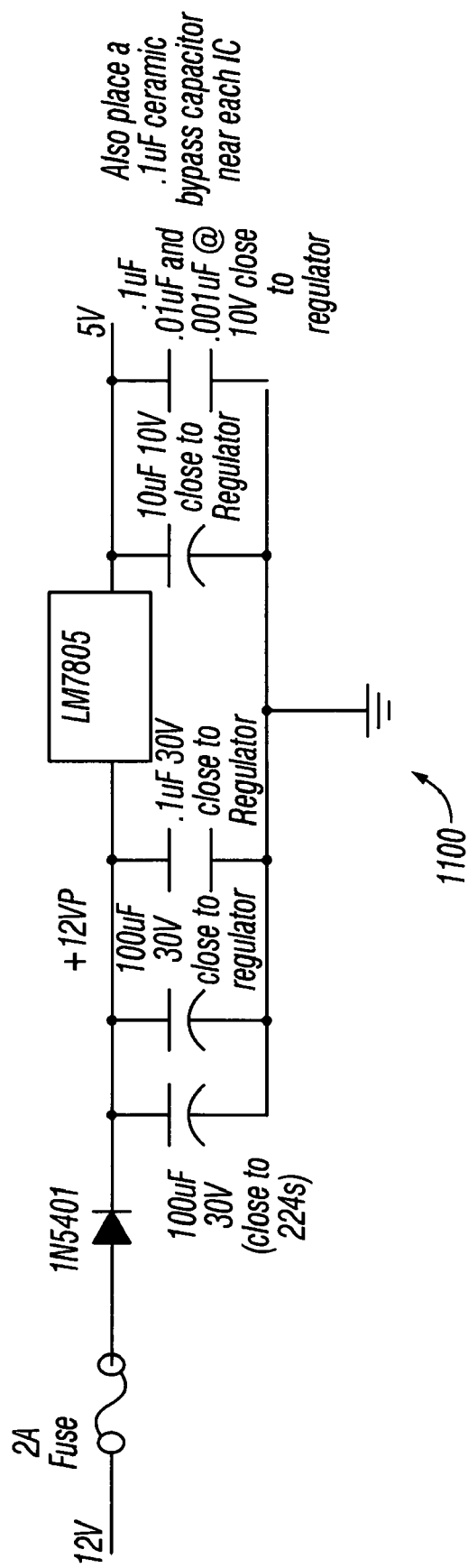
FIG. 11 shows a detailed circuit diagram for the power source fuse in accordance with an embodiment of the present invention.

Power is supplied to the PCM 900 through a power source fuse 920. FIG. 11 shows a detailed circuit diagram 1100 for this fuse. Like the protection circuits 911-915, the power fuse protects the processor 910 and other components and is a standard component in transmission controllers.

The data supplied by the sensor circuits 911-915 is processed by the processor 910 according to a circuit program 902. The circuit program 902 can be changed and customized according to the specific engine/transmission combination in question, allowing the PCM 900 to execute an efficient shift strategy regardless of the make and model of the engine and transmission.

Commands regarding the shift process are then sent from the processor 910 to the Torque Control Clutch (TCC)

solenoid switch 930 and the specific gear shift solenoid switch that is needed (941, 942 or 943).

Figure 12:
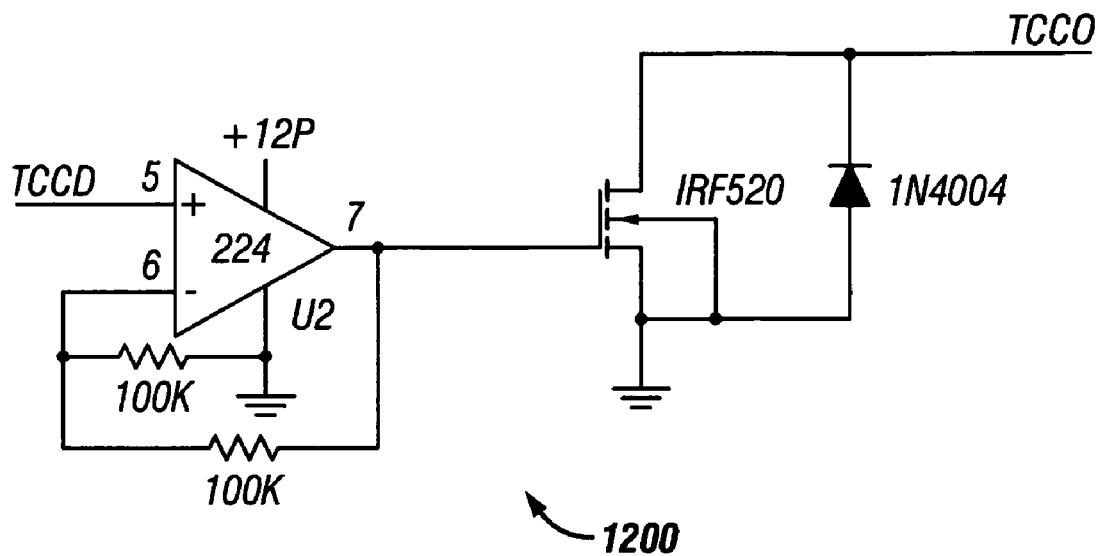
FIG. 12 is a circuit diagram for a Torque Converter Clutch (TCC) switch in accordance with an embodiment of the present invention.
Figure 13:
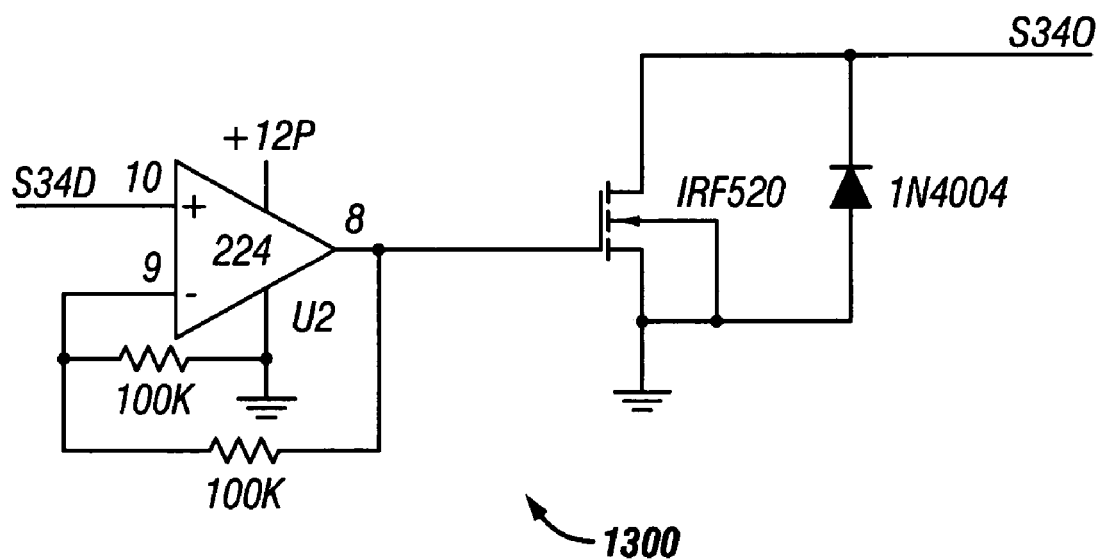
FIG. 13 is a circuit diagram for a 3-4 solenoid switch in accordance with an embodiment of the present invention.

Circuit diagrams for the TCC switch and 3-4 solenoid switch are depicted in FIGS. 12 and 13 respectively. The 3-4 shift solenoid switch controls the valve for the shift between $3^{rd}$ and $4^{th}$ gear. The TCC solenoid engages and disengages the Torque Converter Clutch.

Figure 14:
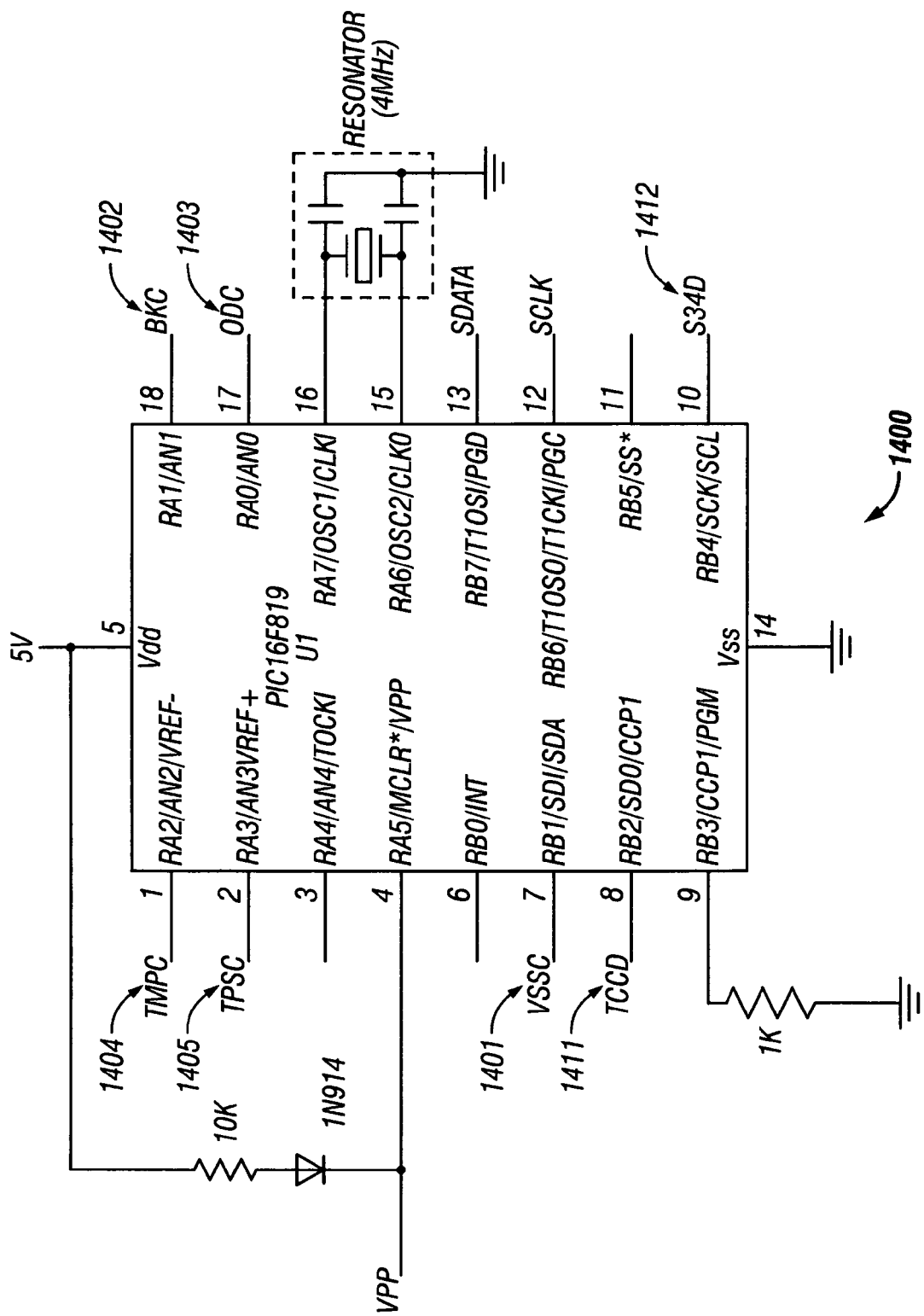
FIG. 14 shows a circuit diagram of a PCM processor in accordance with an embodiment of the present invention.

FIG. 14 shows a circuit diagram of the PCM processor in accordance with an embodiment of the present invention. This figure shows the input pins 1401-1405 for the sensor input signals as well as the output pins 1411, 1412 for the TCC and 3-4 shift switches, respectively.

Figure 15:
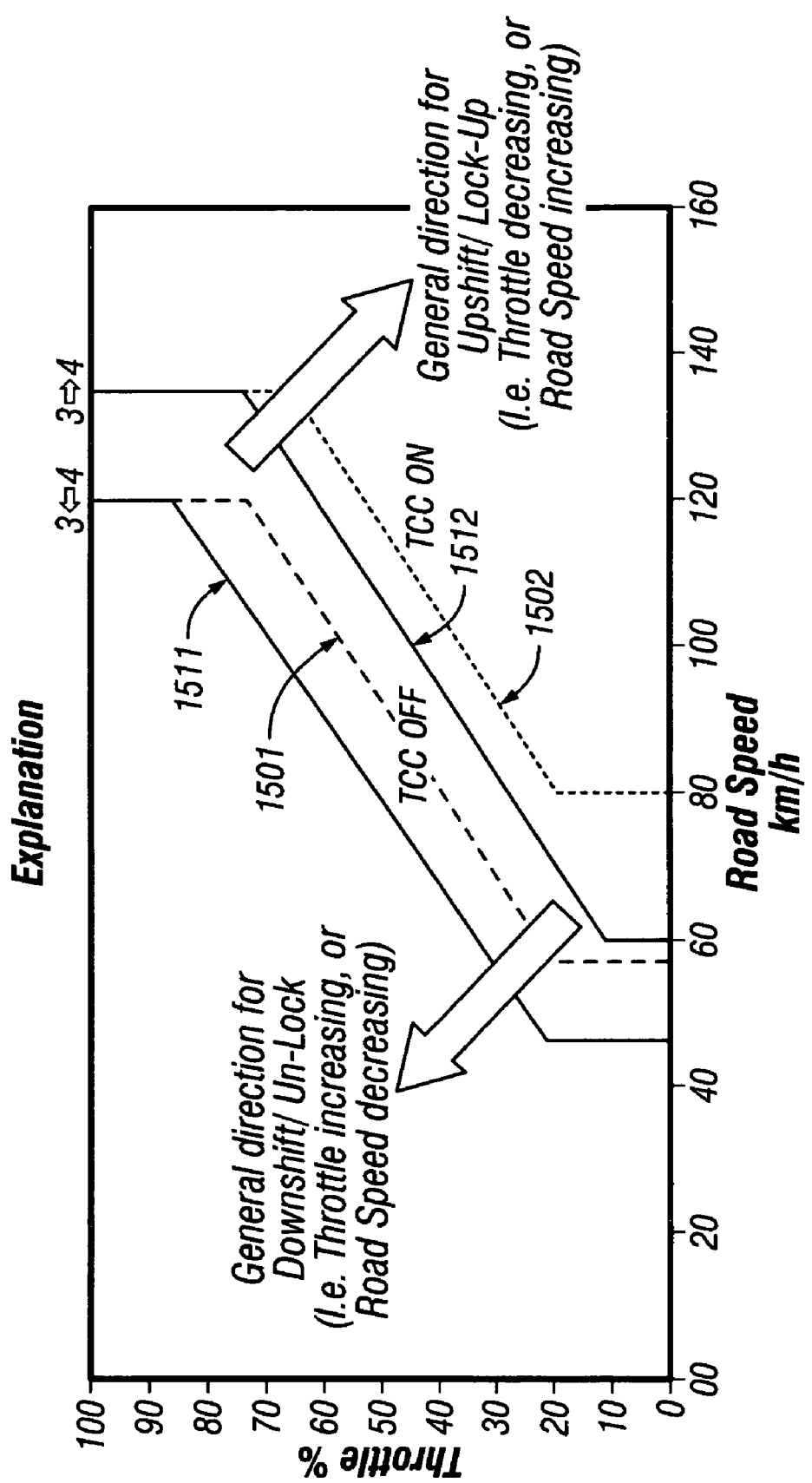
FIG. 15 is a graph depicting an example 3-4 gear shift strategy for an automatic transmission in accordance with an embodiment of the present invention.

FIG. 15 is a graph depicting an example 3-4 gear shift strategy for an automatic transmission in accordance with an embodiment of the present invention. The graph shows the relationship between the parameters of throttle position and vehicle road speed to determine the optimal point of switching between $3^{rd}$ and $4^{th}$ gear.

The dotted lines 1501, 1502 represent the value thresholds for the TCC to switch on and off. The left dotted line 1501 represents the threshold for switching off the TCC. Conversely, the right dotted line 1502 represents the threshold for switching on the TCC.

The solid lines 1511, 1512 in the graph represent the thresholds for shifting between $3^{rd}$ and $4^{th}$ gear. The left solid line 1511 represents the threshold for downshifting from $4^{th}$ to $3^{rd}$ gear, while the right solid line 1512 represents the threshold for up shifting from $3^{rd}$ to $4^{th}$ gear.

The following table summarizes the throttle position and vehicle speed values that define the gear shift and TCC pattern depicted in FIG. 15:

might have to be altered to accommodate the performance characteristic of a new engine designed by another firm.

The ability to alter the circuit program of the PCM in the present invention provides the flexibility to tailor the shift pattern to the engine/transmission combination as needed, without being limited to a pre-set program for the original design that is restricted to a specific engine/transmission combination.

Figure 16A:
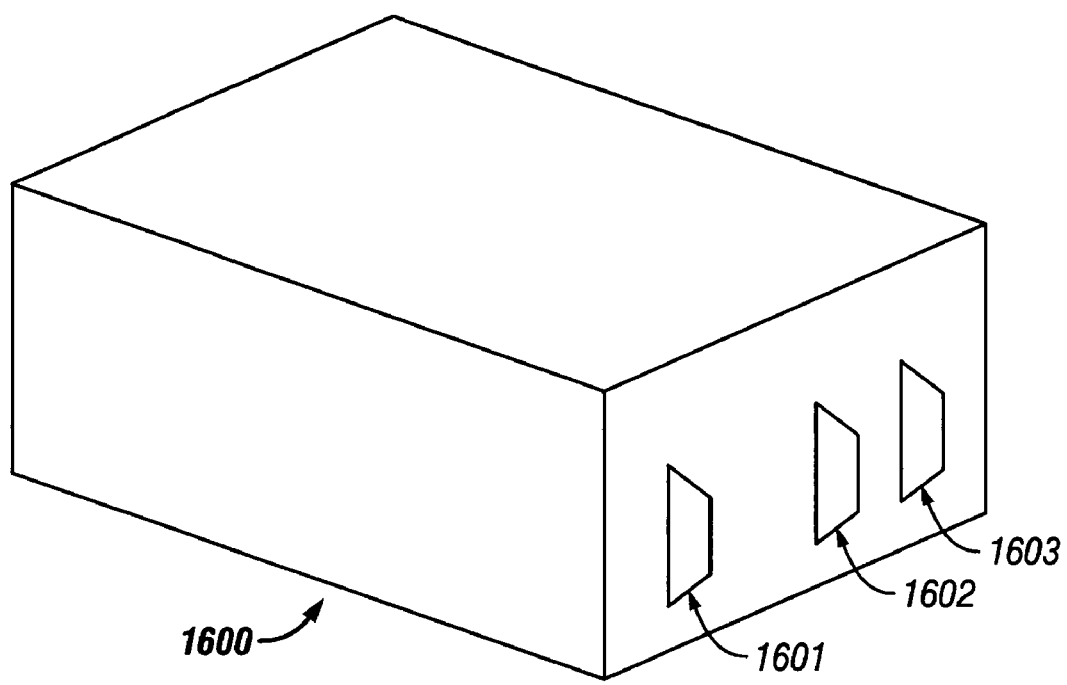
FIG. 16A shows the front view of a housing for the PCM in accordance with an embodiment of the present invention.
Figure 16B:
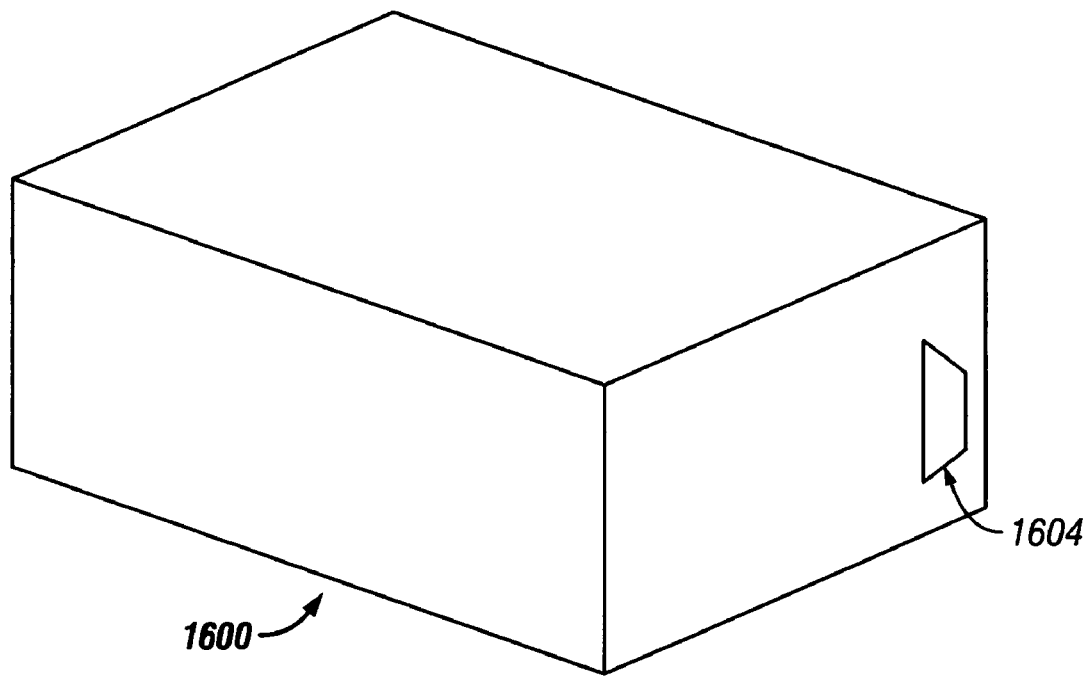
FIG. 16B shows the back view of a housing for the PCM in accordance with an embodiment of the present invention.

FIGS. 16A and 16B show the front and back views, respectively, of a housing for the PCM of an embodiment of the present invention. The housing 1600 depicted in this example has four connectors 1601-1604 for the input and output of data. Connector 1601 receives input from the engine sensors. Connectors 1602 and 1603 are for control output to the transmission. Connector 1602 connects to the 3-4 solenoid switch, while connector 1603 connects to the TCC solenoid. The connector 1604 on the opposite side of the housing 1600 is for data entry to the PCM circuit program.

Figure 17:
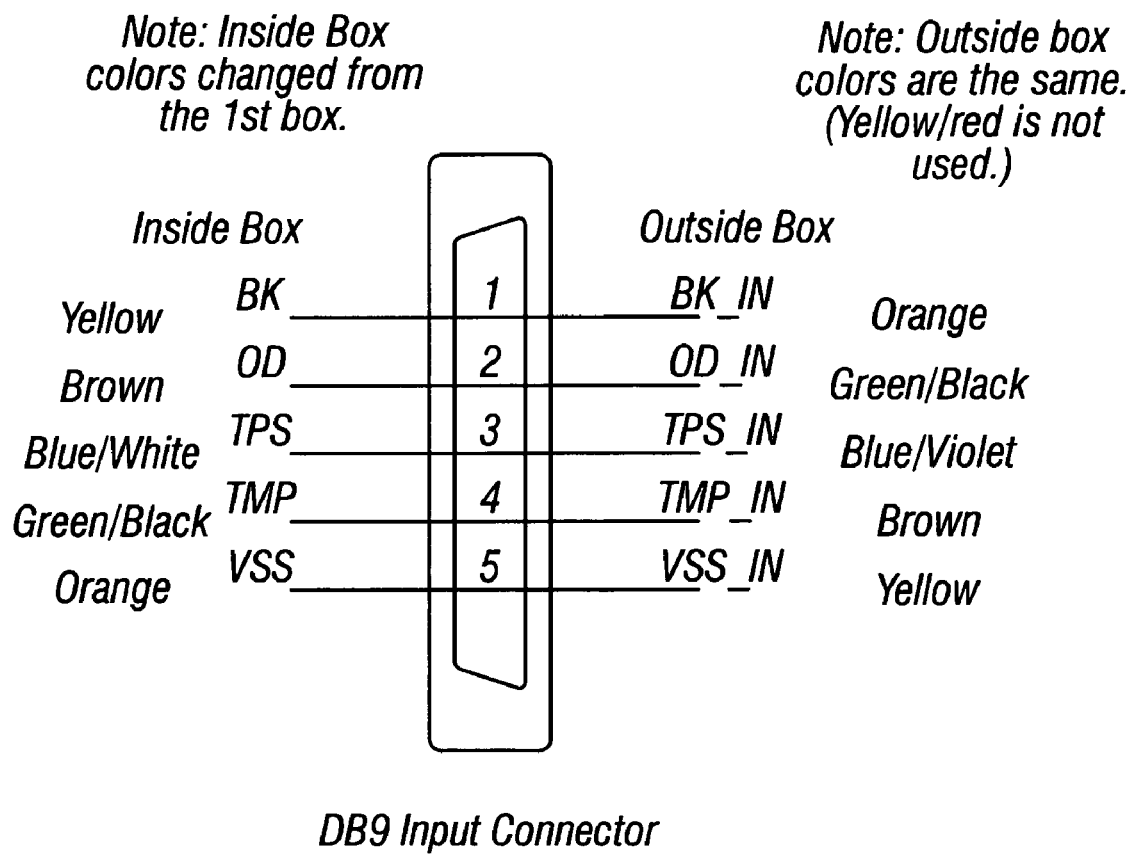
FIG. 17 shows the input connector for the engine in accordance with an embodiment of the present invention.

FIG. 17 shows the input connector for the engine in accordance with an embodiment of the present invention. This figure is a more detailed view of connecter 1601 in FIG. 16A.

Figure 18:
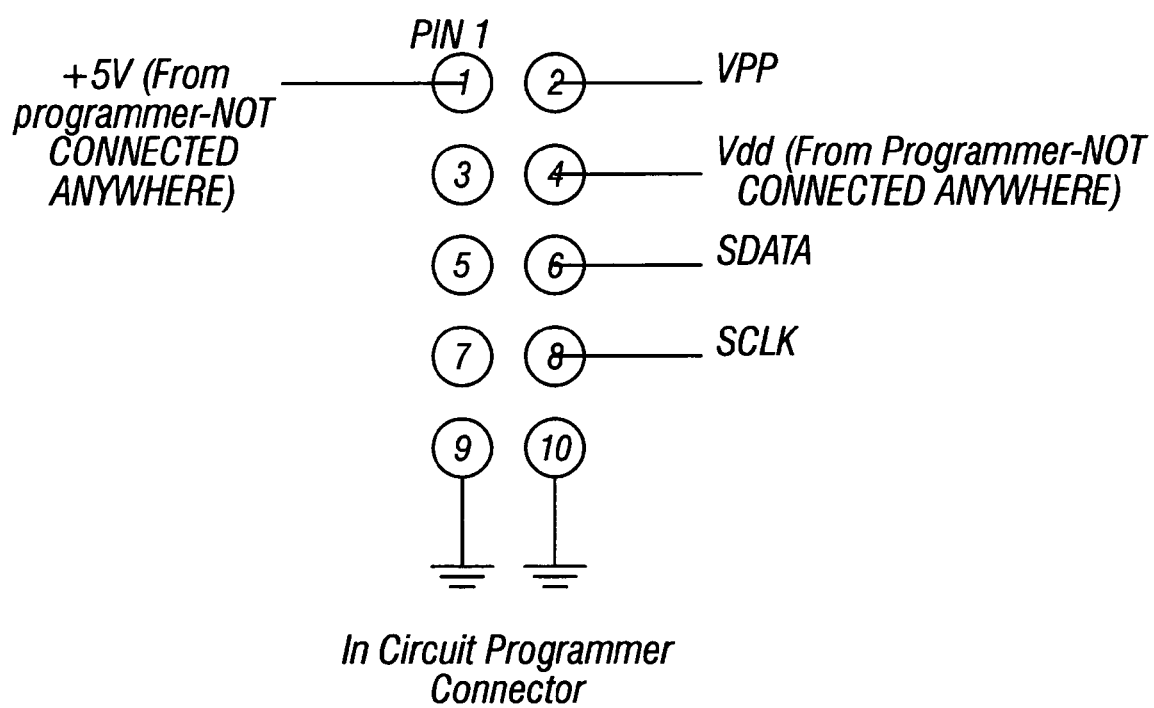
FIG. 18 shows the circuit programmer input connector in accordance with an embodiment of the present invention.

FIG. 18 shows the circuit programmer input connector in accordance with an embodiment of the present invention. This figure is a more detailed view of connector 1604 in FIG. 16B.

The description of the present invention has been presented for purposes of illustration and description, and is not intended to be exhaustive or limited to the invention in the form disclosed. Many modifications and variations will be

TABLE 2

| 3-4 Shift | | 4-3 shift | | TCC On | | TCC Off | |
| --- | --- | --- | --- | --- | --- | --- | --- |
| Throttle % | Speed km/hr | Throttle % | Speed km/hr | Throttle % | Speed km/hr | Throttle % | Speed km/hr |
| 0 | 60 | 0 | 46 | 0 | 80 | 0 | 57 |
| 11 | 60 | 21 | 46 | 19.3 | 80 | 20.4 | 57 |
| 74 | 135 | 86 | 120 | 65.8 | 135 | 73 | 120 |
| 100 | 135 | 100 | 120 | 100 | 135 | 100 | 120 |

The TCC solenoid is hydraulically overridden below 30 mph and disengages the clutch. The converter clutch is disengaged or prevented from engaging during the following driving conditions:

The engine coolant temperature is below 53.3° C. or above 115° C.

Application of brakes

Closed throttle or wide open throttle

Quick throttle opening or closing

During engine loads required for a 4-3 downshift to occur. This ensures all 4-3 downshifts occur with the converter clutch disengaged.

It should be kept in mind that the specific values for the gear shift and TCC pattern in FIG. 15 are merely examples, but they help illustrate the parameters that are taken into account in developing the proper shift strategy that is programmed into the PCM. The values used are empirically derived and depend upon the specific transmission and engine combination in question. This is particularly important when engines and transmissions that were not originally designed to work together are combined, as is often the case in third world automobile manufacture. In such a case, the shift strategy developed for the original transmission design apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A universal power control module for automatic transmissions, comprising:

(a) a processor;

(b) two or more sensor inputs that convey engine and vehicle data to the processor, wherein the number of sensor inputs and the type of sensor inputs vary according to the needs of each particular combination of engine and transmission with which the power control module is employed, allowing the power control module to facilitate communication between engines and transmissions that were not originally designed to work together;

(c) two or more outputs that convey commands from the processor to a torque control clutch and gear shift solenoid in the transmission, wherein the number of outputs and the type of outputs vary according to the needs of each particular combination of engine and transmission with which the power control module is employed, allowing the power control module to facilitate communication between engines and transmissions that were not originally designed to work together; and (d) program circuitry that defines the gear shift pattern of the transmission according to the engine and vehicle sensor data in part (b), wherein the program circuitry is programmed to define an optimal gear shift pattern for any combination of engine and transmission, independent of make and model, including engines and transmissions that were not originally designed to work together, wherein the program circuitry alters the gear shift strategy of the transmission from its original design in order to accommodate performance characteristics of an engine not originally designed for use with said transmission.

2. The power control module according to claim 1, wherein the engine and vehicle data in part (b) include at least one of the following:

vehicle speed;
brake activity;
overdrive;
engine temperature;
throttle position;
engine load; and
engine RPM.

3. The power control module according to claim 1, wherein the number of sensor inputs in part (b) ranges from two to five.

* * * * *

UNITED STATES PATENT AND TRADEMARK OFFICE
CERTIFICATE OF CORRECTION

PATENT NO.       : 7,343,236 B2
APPLICATION NO.  : 11/257269
DATED            : March 11, 2008
INVENTOR(S)      : Barry Wilson It is certified that error appears in the above-identified patent and that said Letters Patent is hereby corrected as shown below:

Column 3, line 14, please delete "modem" and insert --modern-- therefore.
Column 6, line 44, please delete "(E1)" and insert --(EI)-- therefore.

Signed and Sealed this

Twenty-sixth Day of August, 2008

JON W. DUDAS
*Director of the United States Patent and Trademark Office*